(12) United States Patent
Scheinhardt et al.

(10) Patent No.: US 11,600,254 B2
(45) Date of Patent: Mar. 7, 2023

(54) ACOUSTIC FOAM DECOUPLER

(71) Applicant: AUTONEUM MANAGEMENT AG, Winterthur (CH)

(72) Inventors: Michael Scheinhardt, Weiterstadt (DE); Marco Seppi, Altstätten (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 644 days.

(21) Appl. No.: 16/348,440

(22) PCT Filed: Nov. 6, 2017

(86) PCT No.: PCT/EP2017/078339
§ 371 (c)(1),
(2) Date: May 8, 2019

(87) PCT Pub. No.: WO2018/091301
PCT Pub. Date: May 24, 2018

(65) Prior Publication Data
US 2019/0259365 A1 Aug. 22, 2019

(30) Foreign Application Priority Data
Nov. 17, 2016 (EP) .................................. 16199261

(51) Int. Cl.
*G10K 11/168* (2006.01)
*B32B 3/30* (2006.01)
(Continued)

(52) U.S. Cl.
CPC .............. *G10K 11/168* (2013.01); *B32B 3/30* (2013.01); *B32B 5/022* (2013.01); *B32B 5/18* (2013.01);
(Continued)

(58) Field of Classification Search
CPC ......... G10K 11/168; B32B 3/30; B32B 5/022; B32B 5/18; B32B 5/245; B32B 7/12;
(Continued)

(56) References Cited

U.S. PATENT DOCUMENTS 3,013,937 A * 12/1961 Brown ....................... D21J 1/00
162/204
3,087,566 A 4/1963 Watters
(Continued)

FOREIGN PATENT DOCUMENTS

| EP | 0079253 | 5/1983 |
|---|---|---|
| EP | 1428656 | 6/2004 |

(Continued)

OTHER PUBLICATIONS

ISR, dated Jan. 15, 2018.
(Continued)

*Primary Examiner* — Travis M Figg
(74) *Attorney, Agent, or Firm* — FisherBroyles, LLP; Craig W. Mueller (57) ABSTRACT

A noise attenuating trim part for a vehicle, with acoustic mass-spring characteristics comprising a mass layer comprising at least an impervious barrier layer, and a decoupling layer consisting of open cell foam and wherein the decoupling layer has a first surface adjacent to the mass layer and a second surface facing away from the mass layer, and wherein the decoupling layer and mass layer are laminated together and wherein the decoupling layer has at least one region with a plurality of indentations wherein each indentation comprises a round base area wherein the round base areas are situated in plane with the second surface and wherein the total surface area of the round base areas is between 10 and 40% of the total surface area of the second surface of the decoupling layer.

27 Claims, 6 Drawing Sheets

(51) Int. Cl.
  *B32B 5/02* (2006.01)
  *B32B 5/18* (2006.01)
  *B32B 5/24* (2006.01)
  *B32B 7/12* (2006.01)
  *B32B 27/06* (2006.01)
  *B32B 27/12* (2006.01)
  *B32B 27/30* (2006.01)
  *B32B 27/40* (2006.01)
  *B60R 13/08* (2006.01)

(52) U.S. Cl.
  CPC .............. *B32B 5/245* (2013.01); *B32B 7/12* (2013.01); *B32B 27/065* (2013.01); *B32B 27/12* (2013.01); *B32B 27/306* (2013.01); *B32B 27/40* (2013.01); *B60R 13/083* (2013.01); *B32B 2266/0278* (2013.01); *B32B 2266/06* (2013.01); *B32B 2305/022* (2013.01); *B32B 2307/102* (2013.01); *B32B 2307/54* (2013.01); *B32B 2307/718* (2013.01); *B32B 2307/72* (2013.01); *B32B 2307/7265* (2013.01); *B32B 2605/003* (2013.01); *B32B 2605/08* (2013.01)

(58) Field of Classification Search
  CPC ..... B32B 27/065; B32B 27/12; B32B 27/306; B32B 27/40; B32B 2266/0278; B32B 2266/06; B32B 2305/022; B32B 2307/102; B32B 2307/54; B32B 2307/718; B32B 2307/72; B32B 2307/7265; B32B 2605/003; B32B 2605/08; B60R 13/083
  See application file for complete search history.

(56) References Cited

U.S. PATENT DOCUMENTS

| | | |
|---|---|---|
| 3,647,022 A * | 3/1972 | Meyer .................... G10K 11/16 181/290 |
| 3,770,560 A * | 11/1973 | Elder ........................ B32B 3/30 428/116 |
| 4,106,588 A | 8/1978 | Moore et al. |
| 4,242,398 A * | 12/1980 | Segawa ..................... B32B 5/26 428/218 |
| 4,803,112 A * | 2/1989 | Kakimoto ................. B32B 3/30 428/167 |
| 4,940,112 A | 7/1990 | O'Neill |
| 5,298,694 A | 3/1994 | Thompson et al. |
| 5,304,415 A | 4/1994 | Kurihara et al. |
| 5,446,250 A * | 8/1995 | Oka .......................... B63B 3/68 181/208 |
| 5,509,247 A * | 4/1996 | Fortez ................ B60R 13/0225 52/630 |
| 5,536,556 A | 7/1996 | Juriga |
| 5,670,235 A * | 9/1997 | Stricker .................. B32B 3/266 428/483 |
| 5,744,763 A * | 4/1998 | Iwasa .................... G10K 11/165 181/290 |
| 5,892,187 A * | 4/1999 | Patrick ................ B60R 13/0815 181/290 |
| 5,922,265 A | 7/1999 | Parekh |
| 5,923,002 A | 7/1999 | McGrath et al. |
| 6,145,617 A | 11/2000 | Alts |
| 6,177,180 B1 | 1/2001 | Bodine et al. |
| 6,290,022 B1 | 9/2001 | Wolf et al. |
| 6,712,179 B2 | 3/2004 | Bouyonnet |
| 6,878,432 B2 | 4/2005 | Ueda et al. |
| 6,955,845 B1 | 10/2005 | Poole et al. |
| 6,971,475 B2 * | 12/2005 | Tompson ............ B60R 13/0815 181/290 |
| 6,983,822 B2 | 1/2006 | O'Regan et al. |
| 7,318,498 B2 | 1/2008 | Woodman et al. |
| 7,677,358 B2 | 3/2010 | Tocchi et al. |
| 7,789,196 B2 | 9/2010 | Fukuhara et al. |
| 8,066,097 B2 | 11/2011 | Boyadjian et al. |
| 8,091,685 B2 | 1/2012 | Nakamura et al. |
| 8,109,361 B2 | 2/2012 | Tsugihashi et al. |
| 8,256,572 B2 | 9/2012 | Castagnetti et al. |
| 8,261,876 B2 | 9/2012 | Castagnetti et al. |
| 8,360,201 B2 | 1/2013 | Tanase |
| 8,590,669 B2 | 11/2013 | Wyerman et al. |
| 8,590,670 B1 | 11/2013 | Grube et al. |
| 8,627,922 B2 | 1/2014 | Fournier et al. |
| 8,636,105 B2 | 1/2014 | Castagnetti et al. |
| 8,636,106 B2 | 1/2014 | Castagnetti et al. |
| 8,657,067 B1 * | 2/2014 | Mathur .................. B32B 15/20 181/290 |
| 8,863,897 B2 | 10/2014 | Bertolini |
| 2004/0075290 A1 | 4/2004 | Campbell |
| 2004/0129493 A1 * | 7/2004 | Campbell ............... B60R 13/08 181/204 |
| 2004/0131836 A1 | 7/2004 | Thompson |
| 2005/0006173 A1 * | 1/2005 | Albin ...................... D04H 1/74 181/290 |
| 2005/0263346 A1 * | 12/2005 | Nishimura ............. G10K 11/16 181/290 |
| 2006/0113146 A1 | 6/2006 | Khan et al. |
| 2006/0201741 A1 | 9/2006 | Inoue et al. |
| 2007/0272482 A1 | 11/2007 | Yamaguchi et al. |
| 2008/0067002 A1 | 3/2008 | Pfaffelhuber et al. |
| 2008/0073146 A1 | 3/2008 | Thompson et al. |
| 2010/0065368 A1 | 3/2010 | Tazian |
| 2010/0230206 A1 | 9/2010 | Tinianov et al. |
| 2013/0133978 A1 * | 5/2013 | Borroni .................. B32B 5/022 181/291 |
| 2014/0014438 A1 * | 1/2014 | Bertolini ............ G10K 11/002 181/290 |
| 2019/0259365 A1 * | 8/2019 | Scheinhardt ........... B32B 5/022 |

FOREIGN PATENT DOCUMENTS

| | | |
|---|---|---|
| EP | 1612768 | 1/2006 |
| EP | 1742048 | 1/2007 |
| EP | 2159786 | 3/2010 |
| EP | 2365783 A1 | 9/2011 |
| FR | 2908550 | 5/2008 |
| JP | 2001310672 | 11/2001 |
| JP | 2001347899 | 12/2001 |
| WO | WO2006007275 | 1/2006 |

OTHER PUBLICATIONS

Bertolini, et al., Transfer Function Based Method to Identify Frequency Dependent Young's Modulus, Poisson's Ratio and Damping Loss Factor of Poroelastic Materials, Symposium on acoustics of poro-elastic materials (SAPEM), Bradford, Dec. 2008.

Langlois, et al., Polynomial Relations for Quasi-Static Mechanical Characterization of Isotropic Poroelastic Materials, J. Acoustical Soc. Am. 2001, vol. 10, No. 6, p. 3032-3040.

Brouard B., et al., A General Method of Modelling Sound Propagation in Layered Media, Journal of Sound and Vibration, 1995, vol. 183, No. 1, p. 129-142.

European Search Report dated Aug. 17, 2010 of European Application No. 10155903 (5 pages).

* cited by examiner

ACOUSTIC FOAM DECOUPLER

This application is the United States national phase of PCT Application No. PCT/EP2017/078339, filed with the World Intellectual Property Office on Jun. 11, 2017, which claims the benefit of EP16199261.5, filed with the European Patent Office on Nov. 17, 2016, the entireties of which are incorporated by reference herein.

TECHNICAL FIELD

The present invention is directed to an automotive interior trim part, such as inner dash insulators and floor carpets, for noise attenuation in vehicles, in particular in cars.

BACKGROUND ART

There are many sources of noise in a vehicle such as noise from power train, tire noise, brake noise and wind noise. The noise generated by these different sources enters into the vehicle's passenger compartment and may cover a rather wide frequency range, especially the range 400 to 4000 Hz.

For noise attenuation in vehicles, particularly in cars and trucks, the use of trim parts such as insulators and absorbers to reflect and dissipate noise and thus reduce the overall interior noise level is well known.

Noise attenuating trim parts, also referred to as trim parts, such as inner dash insulators and floor carpet systems, are moulded into a three dimensional shape in order to follow the shape of the vehicles body when installed in the vehicle.

Trim parts for insulation are traditionally obtained by means of a "mass-spring" barrier system, where the mass element is formed by a layer of high density impervious material normally designated as heavy layer and where the spring element, also called decoupler or decoupling layer, is formed by a layer of elastic material such as foam or non-compressed felt.

A mass-spring system is normally placed in a vehicle on top of a metal layer, such as the car body floor or firewall, with the spring element in contact with the metal layer.

The effectiveness of a trim part may be characterised by the insertion loss (IL), measured in decibel (dB), allowing an estimation of the performance of the trim part independent of the metal layer.

In addition to the acoustic performance these trim parts should also provide certain overall rigidity in order to make it easier to handle the part for example during installation as well as local rigidity such as tread strength, for instance not being too soft and spring back too much when pressing on the trim part for example when standing on the trim part while stepping in or out of the vehicle.

It is known in the art to use a decoupler layer with slits or protrusions creating large cavities between the car floor and the decoupler. The common belief is that the cavities should cover an area as large as possible in order to reduce the contact area between the decoupler layer and the vehicle body as much as possible and to disconnect the trim part from the floor creating a double-wall-system with an air layer. Another reason to make the cavities as large as possible is that it was assumed that the cavities may act as resonators, such as Helmholtz resonators, improving the noise absorption. However such resonators may only work, if at all, from a certain size of the cavity and for a very narrow frequency range.

One prior art option proposed in the past was a decoupler with square indentations or rather thin protruding foam stripes or walls. However for these trim parts the tread strengths is most likely too low and there is a high risk that the decoupler layer will collapse during use and the decoupling layer and cavities may be compressed such that the entire or at least almost the entire decoupling layer is in contact with the vehicle floor reducing the acoustic performance. Trim parts with large areas not in contact with the vehicle body have several additional disadvantages such as reduced overall rigidity of the trim part as well as reduced local stiffness, as a result of only a small part of the foam layer being in contact with the metal body.

Other disadvantages are production problems due to the shape, where areas with thin foam stripes and or walls may get stuck in the mould and the decoupling layer being destroyed during demoulding of the trim part from the moulding tool.

Further production problems may occur during the foaming process of the decoupling layer caused by the flow of the foam components being hindered by the shape of larger indentations, resulting in inhomogeneity in the foam decoupling layer. In order to be able to fill the complete mould and especially in the areas the thin stripes and or walls, more foam has to be put into the mould increasing the weight and the stiffness of the decoupling layer.

Normally the space available for vehicle trim parts is limited and an improvement of the insertion loss by increasing the thickness of the trim part is generally not an alternative.

In order to improve the insertion loss of the trim part the weight of the mass layer may be increased, but this weight increase influence the vehicle's fuel economy negatively.

It is object of the present invention to obtain a noise attenuating trim part, with reduced weight and improved insertion loss as well as to overcome the disadvantages of the state of the art.

SUMMARY OF INVENTION

The object of the invention is achieved by a noise attenuating trim part, especially for noise insulation, for a vehicle, with acoustic mass-spring characteristics according to claim 1, comprising a mass layer comprising at least an impervious barrier layer, and a decoupling layer consisting of open cell foam and wherein the decoupling layer has a first surface adjacent to the mass layer and a second surface facing away from the mass layer, and wherein the decoupling layer and mass layer are laminated together and wherein the decoupling layer has at least one region with a plurality of indentations wherein each indentation comprises a round base area, wherein the round base areas are situated in plane with the second surface and wherein the foam is an open cell foam and wherein the total surface area of the round base areas is between 10 and 40% of the total surface area of the second surface of the decoupling layer.

Preferably the radius of the round base areas is between 4 to 20 mm, preferably between 6 to 16 mm, preferably between 8 to 12 mm.

Preferably the height of the indentations is smaller than the thickness of the decoupling layer being the shortest distance from the base area of the indentation to the first surface of the decoupling layer.

The total area of the second surface, also called B-side in the automotive industry, is including both the total foam area not having indentations as well as the total area of the round base areas of the indentations. The second surface is generally following the shape of the vehicles body when installed in the vehicle.

The decoupling layer is placed in a vehicle, such as a car or truck, with the second surface including the base areas of the indentations directed to the body of the vehicle wherein the indentations create cavities between the foam and the vehicle body and wherein the area of the second surface not having indentations is at least mainly in contact with the vehicle body. The indentations may also be called voids or cavities.

Surprisingly it is not the disconnection of the decoupling layer by maximising the area of the decoupling layer not in contact with the vehicle body that is the main driver for increased noise insulation, but to optimise the overall softening effect of the decoupling layer.

Optimising the overall stiffness of the decoupling layer, without impairing the overall or local rigidity of the trim part, is the main driver for improved noise insulation, e.g. airborne transmission loss and structure born performance.

Mass spring type system trim parts have a resonance frequency, also called "resonance frequency of the mass-spring system" at which the system is not effective as a noise insulator. The resonance frequency mainly depends on the weight of the mass layer (the higher the weight, the lower the resonance frequency) and on the stiffness of the spring layer (the higher the stiffness, the higher the resonance frequency).

At frequencies above the resonance frequency the insertion loss increases more or less linearly, with about 12 dB/octave, and it is therefore desirable to have the resonance frequency at a rather low frequency, but without impairing the overall or local stiffness of the decoupling layer that may cause the foam decoupling layer to collapse due to low stiffness.

By introducing indentations and creating areas of the decoupling layer not in contact with the vehicle body, the weight of the mass layer per area foam in contact with the vehicle body is increased, having the same effect as increasing the weight of the mass layer for a decoupling layer without indentations, resulting in increased noise insulation.

Alternatively the noise insulation can be kept by introducing the indentations and lowering the weight of the mass layer, resulting in lower overall weight of the trim part.

Surprisingly a trim part with an area between 10 and 40% of the decoupling layer not in contact with a vehicle body, such as a car floor or firewall, provides higher or at least the same insertion loss in the relevant frequency range compared to a trim part with a decoupling layer where more than 40% of the area is not in contact with the vehicle body. Moreover a trim part with a decoupling layer with an area between 10 and 40% of the decoupling layer not in contact with the vehicle body performs much better than a trim part where the entire decoupling layer is in contact with the vehicle floor.

The overall area not in contact with the vehicle body, being the total area of the round base areas of the indentations, should therefore not be too small in order to achieve that desired effect.

Preferably the noise attenuating trim part for a vehicle where the total surface area of the base areas is between 15 and 35%, preferably between 20 and 30%, of the total surface area of the second surface of the decoupling layer.

By creating indentations in the decoupling layer according to the invention a weight saving of up to 25% of the decoupling layer can be achieved.

Further weight saving of the trim part may be realised, as mentioned, by reducing the weight of the mass layer still keeping the insulation performance.

In addition to the acoustic improvement, another positive consequence of the optimised area of the decoupling layer not in contact with the vehicle body compared to a decoupling layer where more than 40% is not in contact, is that the trim part has an improved tread strength and can better withstand conditions during use such as not spring back too much when standing on the trim part, e.g. when stepping in or out of the vehicle.

Reducing the contact area between the decoupling layer and the vehicle body too much has also the disadvantage that the damping of the vibrations of the vehicle body due to the decoupling layer contacting the floor is reduced, worsening the vibration damping of the vehicle body.

Compared to conventional insulating systems or systems with maximised area not in contact, the invention provides besides low weight, better possibilities to control and optimise the overall stiffness of the trim part since the location of the relatively small indentations can be selected also taking the overall as well as local stiffness of the trim part into account.

With indentations according to the invention the decoupling layer will keep its general shape still following the shape of the vehicle floor when installed in a vehicle.

Indentations with too small height in relation to the thickness of the decoupling layer will have very limited effect on the acoustic performance. On the other hand indentations with too high height in relation to the thickness of the decoupling layer will also have a limited additional effect on the acoustic performance but bringing the disadvantage by impairing the overall stiffness of the trim part as well as hampering the foam flow during production.

Preferably the height of the indentations is between 40 and 74%, preferably 45 and 70%, preferably 50 and 65% of the total thickness of the decoupling layer being the shortest distance from the base area of the indentation to the first surface of the decoupling.

Preferably the height of the indentations is between 4 to 20 mm, preferably between 6 to 16 mm, preferably between 8 to 12 mm.

In order to not impede the flow of the foam components, during foaming of the decoupling layer when producing the trim part, very thin foam thicknesses should be avoided. It is therefore desirable that the thickness of the foam at the top of the indentation is at least 3 mm to ensure a smooth foaming process.

The trim part according to the invention has an area between 10 and 40% of the second surface of the decoupling layer not in contact with the vehicle body when placed in the vehicle. In order to achieve this range of area not in contact, some regions of the trim part must have a larger area not in contact with the vehicle body since it may not be possible to place indentations in all regions of the second surface. For example where the decoupling layer is very thin or where the second surface of the decoupling layer has a strong curvature or in rather vertical areas where indentations would make it more difficult to demould the trim part after moulding.

Preferably the trim part according to the invention has at least one region with a plurality of indentations, wherein the region is defined as the convex hull of the round base areas of these indentations and wherein the region has at least 15 indentations, preferably at least 20 indentations, preferably at least 30 indentations and wherein the total surface area of the round base areas within the region is between 25 and 50%, preferably between 30 and 45%, preferably between 35 and 45% of the surface area of the region.

The trim part may also have regions with less than 15 indentations.

The convex hull of a set of indentations is the smallest convex region or area that contains these indentations.

As a decoupling layer, a standard open cell foam material used for the spring layer in a classic acoustic mass-spring system can be used in the trim part according to the invention following the same principles. The decoupling layer may be formed from any type of thermoplastic or thermosetting foam. Preferably the decoupling layer is made of polyurethane foam.

Preferably the foam has a density between 25 to 100 Kg/m$^3$, preferably 35 to 80 Kg/m$^3$, preferably 45 to 70 Kg/m$^3$.

The decoupling layer has preferably a low compression stiffness of less than 20 kPa, preferably above 4 kPa, preferably between 5 and 15 kPa, preferably between 5 and 10 kPa, measured according to the current ISO 3386-1. The measured stiffness is the compression stress value CV40, also called CLD40 value, measured at 40% compression. In general a softer foam is better from acoustic point of view but might have the drawback of having too low rigidity such as tread strength, for instance being too soft and spring back too much when pressing on the trim part for example when standing on the trim part while stepping in or out of the vehicle.

Indentations may further reduce the overall rigidity of the trim part and the size, shape and position should be selected such that the overall rigidity and shape of the trim part is influenced as little as possible.

If the walls between the indentations are too thin and the area of the decoupling layer not in contact with the vehicle floor is large, the walls will not contribute enough to the local compression stiffness of the decoupling layer and therefore a certain distance is required.

Figure 4:
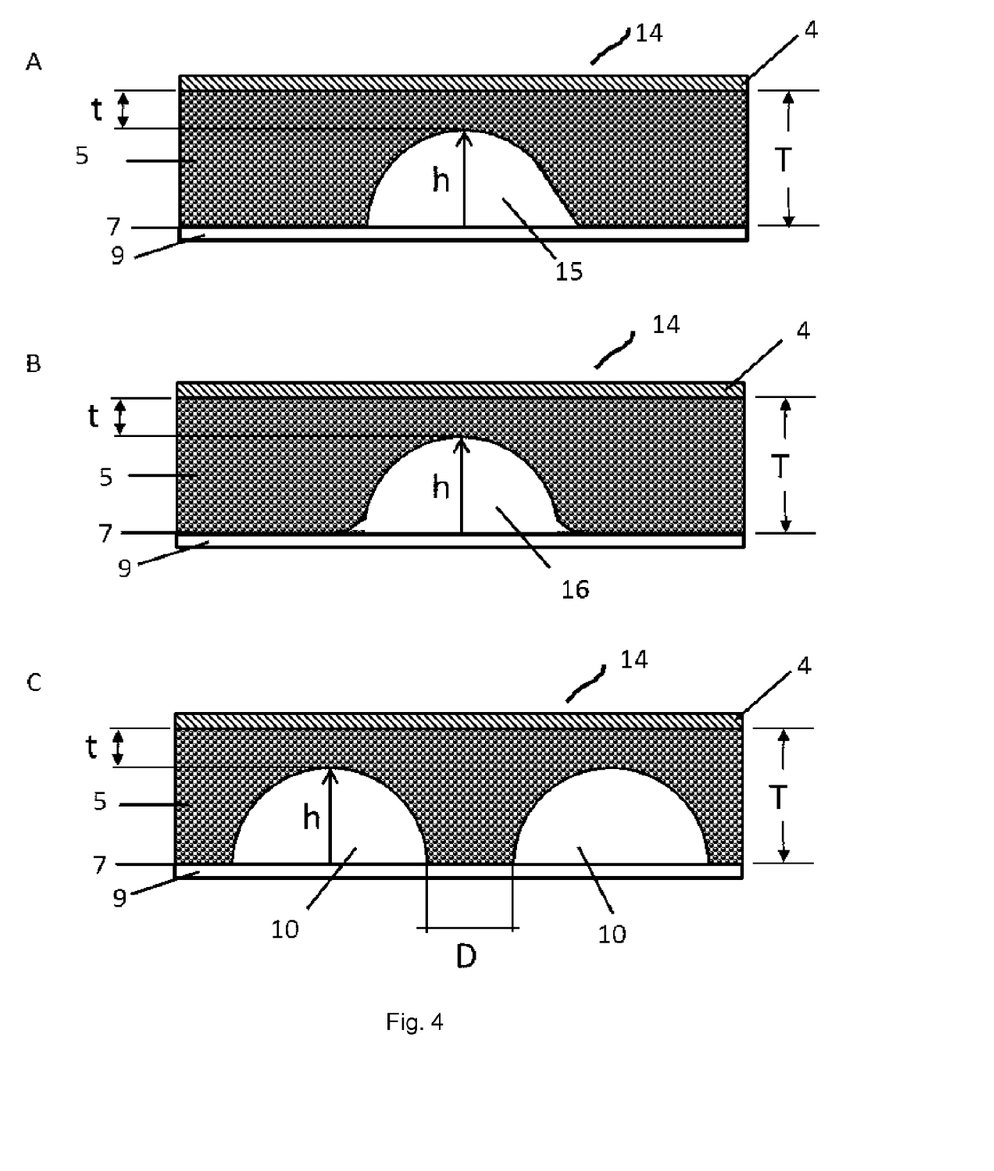
FIGS. 4A, 4B and 4C shows schematic examples of cross sections of a noise attenuating trim part (14) according to the invention.

Preferably the shortest distance between two indentations is more than 4 mm, preferably at least 5 mm, preferably at least 6 mm, preferably at least 8 mm. The shortest distance is the distance (D) between the borders of two round shapes of two neighbouring indentations as shown in FIG. 4C.

In order to counteract the reduced stiffness due to the indentations and to improve the resistance to static load, the shape of the indentations is preferably curved.

Preferably at least one of the indentations has the shape of a hemispheroid, preferably the shape of a hemisphere. More preferably the majority of the indentations, preferably all indentations have the shape of a hemispheroid, preferably the shape of a hemisphere.

Introducing indentations in the decoupling layer may impair the demoulding properties of the decoupling layer during production of the trim part. Areas of the decoupling layer substantially parallel to the demoulding direction should be avoided in order to have smooth handling and to avoid destroying the decoupling layer during demoulding. Thin walls in the decoupling layer should also be avoided since they may easily get stuck in the moulding tool and destroyed during demoulding.

Indentations with a curved shape such as hemispheroid shaped indentations, e.g. hemisphere shaped indentations, have depending on where they are placed, basically no walls substantially parallel to the demoulding direction facilitating the demoulding process of the decoupling layer and the trim part.

Round base areas of the indentations and especially elliptic shaped, such as circular shaped base areas, may also make the demoulding easier. A further advantage, especially with circular base areas, is that even if a few base areas are placed rather close, the foam wall between the indentations is only thin at the shortest distance between to circular base areas whereas further away, due to the circular shape, the wall is getting thicker ensuring enough material, around the circular shape, being in contact with the vehicle body supporting the local stiffness.

Preferably at least one of the round base areas has an elliptic shape, preferably a circular shape.

More preferably the majority of the round base areas, preferably all round base areas have an elliptic shape, preferably a circular shape.

In general hemisphere shaped indentations with circular base areas are preferred due to the beneficial stiffness and demoulding properties, but also because of foam flow effectiveness properties.

However in order to further optimise the flow of the foam components during foaming of the decoupling layer, hemispheroid shaped indentations with elliptic base areas such as oval base areas may be advantageous at least in some regions.

The thickness and stiffness of the decoupling layer may be optimised to meet acoustic and stiffness targets as well as overall rigidity requirements of the trim part, however the thickness is mostly depending on space restrictions in the vehicle. Preferably the thickness can be varied over the area of the part to follow the available space in the vehicle. The thickness available may vary between 1 and 100 mm but in most cases the thickness varies between 5 and 40 mm. Typical overall average thickness of decoupling layers of a carpet or inner dash is normally between 15 and 25 mm, e.g. in average about 20 mm.

Preferably the thickness of the decoupling layer in at least the region with the indentations is between 7 and 35 mm, preferably between 10 to 29 mm, preferably between 11 to 24 mm.

The thickness of the decoupling layer is the thickness of the foam itself in areas where there are no indentations and in the areas with indentations the thickness of the decoupling layer is the sum of the height of the indentation and the thickness of the foam at the top of the indentation.

The thickness of the decoupling layer can also be expressed as being the shortest distance from the base area of the indentation to the first surface of the decoupling layer.

With a preferred restriction of having at least 3 mm foam over the indentations in order to ensure a smooth foaming process of the decoupling layer as well as enough overall and local rigidity of the final trim part, the decoupling layer has to be at least 7 mm thick in the regions where indentation of at least 4 mm are placed. In regions where the decoupling layer is thinner than 7 mm it is neither practical nor effective to have indentations.

In principle the decoupling layer should be attached, by lamination, to the mass layer over the entire surface of the part to have the most optimised effect, however due to the production technique very locally this might not be the case. As the part should function overall as an acoustical mass-spring system, small local areas were the layers are not coupled will not impair the overall attenuation effect.

The mass layer may be made of one layer or several layers laminated together. The mass layer preferably comprise at least one impervious (air impermeable) layer in order to function as a noise barrier.

The mass layer may be a single layer of material, so called heavy layer.

In order for the mass layer to work satisfactory, preferably the mass layer has an area weight between 500 to 6500 g/m$^2$.

Preferably the impervious barrier layer is made of a thermoset plastic material selected from the group consisting of ethylene vinyl acetate (EVA) copolymer, polyester, polyethylene terephthalate, high density polyethylene, low density polyethylene, linear low density polyethylene, polypropylene, thermoplastic elastomer, thermoplastic rubber and polyvinyl chloride (PVC) or any combination of the foregoing.

The mass layer may be made of more than one layer for example a classic heavy layer laminated together with a layer of Thermoplastic olefin (TPO) both together forming the mass layer. The layer of Thermoplastic olefin (TPO) may be a decorative layer.

Trim parts with mass layer made of single layer impervious heavy material have normally good noise insulation capabilities but very low noise absorption. In order to improve the absorption of these classic mass spring systems, a lofty porous felt layer or soft open cell foam may be laminated or glued to the mass layer but will however not be included in the mass layer area weight, since this additional porous layer will not or possibly very limited contribute to the mass in the mass spring system.

Preferably the noise attenuating trim part may further comprising an additional layer adjacent to the mass layer, wherein the additional layer is made of porous felt with an area weight of 200 to 600 g/m² or made of open cell foam.

However in order to further save weight and to improve the noise attenuation, the mass layer may comprise a porous fibrous layer in combination with an impervious barrier layer for example film, foil or heavy layer.

In order for such porous fibrous layer to act together with the impervious barrier as a mass layer and actively contribute to the insulation of the trim part, the fibrous layer must have certain minimum dynamic compression Young's modulus. The fibrous layer is then contributing to both the absorption and insulation, providing a good overall acoustic performance of the trim part.

A trim part with such fibrous layer is especially beneficial in combination with the decoupling layer according to the invention since the need for having a heavy mass layer, in order to obtain the required insertion loss, is reduced by using indentations according to the invention.

In order to define the minimum dynamic compression Young's modulus of the porous fibrous layer there are two different criteria's depending on the area weight of the impervious barrier layer used. A porous fibrous layer in combination with a thin and light barrier layer is disclosed in EP 2365483 A and a porous fibrous layer in combination with a heavier barrier layer is disclosed in EP 2684187 A.

The dynamic compression Young's modulus of the fibrous layer is related to the so called radiation frequency of the porous fibrous layer. At the radiation frequency, the top surface of the top absorbing layer vibrates even more than the underlying barrier layer. Due to this effect, the transmission loss and insertion loss of the trim part may be strongly reduced at frequencies around the radiation frequency.

The radiation frequency can be moved to a higher frequency by increasing the dynamic compression Young's modulus of the fibrous layer, improving the insertion loss in the frequency range of interest.

The radiation frequency is not to be confused with the resonance frequency. The resonance frequency is related to the resonance of the complete mass spring system whereas the radiation frequency is a resonance within the thickness of the fibrous layer, moving perpendicular to the main plane of the fibrous layer.

The dynamic compression Young's modulus of a fibrous material depends on several parameters. Firstly the characteristics of the material itself, i.e., the material composition, type and amount of fibres, type and amount of binders, etc. In addition for the same fibre recipe, it depends on the density of the material, which is linked to the thickness of the layer. Therefore, for a certain composition of felt, the dynamic compression Young's modulus can be measured at the different thicknesses and will consequently assume different values, normally increasing when the thickness is decreased.

The minimum stiffness required may be achieved by compressing the fibrous layer during production and or by changing the material composition such as the type and or amount of fibres and or filaments and or the type and or amount of the binder material.

If the impervious barrier layer is a thin film or foil with an area weight of less than 200 g/m², preferably the mass layer consists of the impervious barrier layer and a porous fibrous layer and wherein the porous fibrous layer has a dynamic compression Young's modulus E of at least $96*AW*t_p$ (Pa), with AW area weight (g/m2) and $t_p$ thickness (mm) of the porous fibrous layer and wherein the impervious barrier layer has an area weight of less than 200 g/m² and wherein the impervious barrier layer is situated between the fibrous layer and the decoupling layer and all layers are laminated together.

In this case preferably the mass layer has an area weigh between 500 to 2600 g/m², preferably 800 to 1600 g/m².

Preferably the thin film or foil has a thickness of at least 40 micrometers (μm), preferably 60 to 100 (μm), preferably 60 to 80 (μm).

If the impervious barrier has an area weight of at least 500 g/m² preferably the mass layer consists of the impervious barrier layer and a porous fibrous layer, with the impervious barrier layer being situated between the porous fibrous layer and the decoupling layer and all layers are laminated together, and wherein the porous fibrous layer has a dynamic compression Young's modulus (Pa) of at least $$118*t_p*(AW_b*AW_p+(AW_p*AW_p/4))/(AW_b+AW_p)$$

wherein $AW_b$ being area weight (g/m²) of the barrier layer, $AW_p$ being area weight (g/m²) of the porous fibrous layer, $t_p$ being thickness (mm) of the porous fibrous layer and wherein the impervious barrier layer has an area weight of at least 500 g/m².

Preferably the impervious barrier layer has an area weigh between 500 to 4000 g/m², preferably 1500 to 3000 g/m² and preferably the porous fibrous layer has an area weigh between 400 to 2500 g/m², preferably 800 to 1600 g/m².

In order for the layers to act together as a mass layer it is important that all layers are laminated together. The lamination may be done during production by heating the layers or if needed an adhesive layer in the form of glue, film, powder or liquid spray, as known in the art can be used to laminate the layers, for example the mass layer with the decoupling layer.

The area weight of the mass layer is the sum of all layers acting as mass, for example the sum of the area weight of the fibrous layer and the area weight of the impervious barrier layer.

The thickness of the porous fibrous layer is preferably selected such that it is thick enough to contribute to the noise absorption of the trim part but compressed enough, during the production, in order to have certain stiffness in order to contribute to the noise insulation.

Preferably the thickness $t_p$ of the porous fibrous layer is between 2 and 15 mm, preferably between 3 and 10 mm.

The dynamic compression Young's modulus of the fibrous layer in a produced trim part should be measured in order to check that it is higher than the, according to one of the above criteria's, calculated minimum value.

The porous fibrous layer can be any type of felt. It can be made from any thermo-formable fibrous materials, including those derived from natural and/or synthetic fibres. Preferably the felt is made of recycled fibrous material like shoddy cotton or other recycled fibres, such as polyester.

The fibrous felt material comprises preferably a binding material, either as binding fibres or in resinous material, for instance thermoplastic or thermosetting polymers. At least 30% Epoxy resin or at least 25% bi-component binder fibres is preferred. Other binding fibres or materials achieving the porous fibrous layer according to the invention are possible and not excluded. The porous fibrous layer material can be obtained through a needling process, or any other process that increases the dynamic compression stiffness of the material.

Any material used may be made of virgin or recycled material or a mix thereof.

The noise attenuating trim part for a vehicle may comprise at least one additional layer such as a decorative layer or a carpet layer, preferably a tufted carpet or a nonwoven carpet and wherein the mass layer is situated in between the decoupling layer and the decorative layer or carpet layer The noise attenuating trim part may be used as a vehicle floor covering or inner dash wherein the second surface of the decoupler layer with a plurality of indentations is facing the vehicle floor or firewall. The firewall being the partition between the passenger and engine compartment.

Measurements

The total area of the round base areas of the indentations and the total area of the second surface of the decoupling layer may be estimated by using a CAD drawing if available, or by using a 3D scanner or by other methods known by the skilled person. For example the total area of circular base areas of the indentations may be estimated by measuring the diameter of each base area using a calliper or similar tool and calculate the areas based on the diameter. The area of the second surface of the decoupling layer, with or without including the base areas, may be estimated by cutting a layer of a material with a known density or area weight to the same shape and area as the second surface of the decoupling layer and calculate the area based on the weight of the layer of a material with a known density or area weight.

The area weights, densities, heights and thicknesses may be measured using standard methods known in the art.

The insulation performance of a noise attenuating trim part may be assessed by measuring the transmission loss (TL) of the trim part placed on a structure e.g. a steel panel. The transmission loss is defined as the ratio, expressed in decibels, of the acoustic power incident on the structure and the acoustic power transmitted by the structure to the receiving side. In the case of an automotive structure equipped with an acoustical part, transmission loss is not only due to the presence of the part, but also to the steel structure on which the part is mounted. Since it is important to evaluate the noise insulation capabilities of an automotive acoustical part independently from the steel structure on which it is mounted, the insertion loss is introduced. The insertion loss (IL) of an acoustical part placed on a structure is defined as the difference between the transmission loss of the structure equipped with the noise attenuating trim part ($TL_{part+steel}$) and the transmission loss of the structure alone ($TL_{steel}$):

$$IL_{part} = TL_{part+steel} - TL_{steel} (dB)$$

Methods to measure the transmission loss is well known to the skilled person, e.g. the Isokell system, commercially available at Autoneum Management AG or the two room method according to ISO 140-3.

The dynamic compression Young's modulus of a porous material may be measured with the commercially available "Elwis-S" device (Autoneum Automotive AG), in which the sample is excited under compression stress. The measurement using Elwis-S is described for instance in BERTOLINI, et al. "Transfer function based method to identify frequency dependent Young's modulus, Poisson's ratio and damping loss factor of poroelastic materials". Symposium on acoustics of poroelastic materials (SAPEM), Bradford, December 2008.

The trim part can be produced according to the standard production methods know to the skilled person, preferably with at least a moulding step. The materials may be heated in advance to the moulding or in the same step as the moulding to obtain the lamination of the layers.

The indentations are preferably created by shaped protrusions on the mould surface. The foam layer may be placed in the mould and the indentations are created under heat and compression of the layers. Preferably the foam layer is directly backed foamed, injected, in the mould to the mass layer and the during the foaming process the foam decoupler layer take the form of the mould surface with the shaped protrusions creating the indentations on the second surface of the foam decoupler layer.

During the moulding step the fibrous layer, if used as a part of the mass layer, is compressed and consolidated during the moulding process.

Any range given should include the starting and end points as well as normal expected deviations in the measurements. Start and end point values of different ranges may be combined.

Further embodiments of the invention may be derived from the description also by combining the different embodiments and examples of the invention and may be also derived from the description of the embodiments shown in the figures. The figures are schematic pictures and are not necessarily in scale.

BRIEF DESCRIPTION OF DRAWINGS

Figure 1:
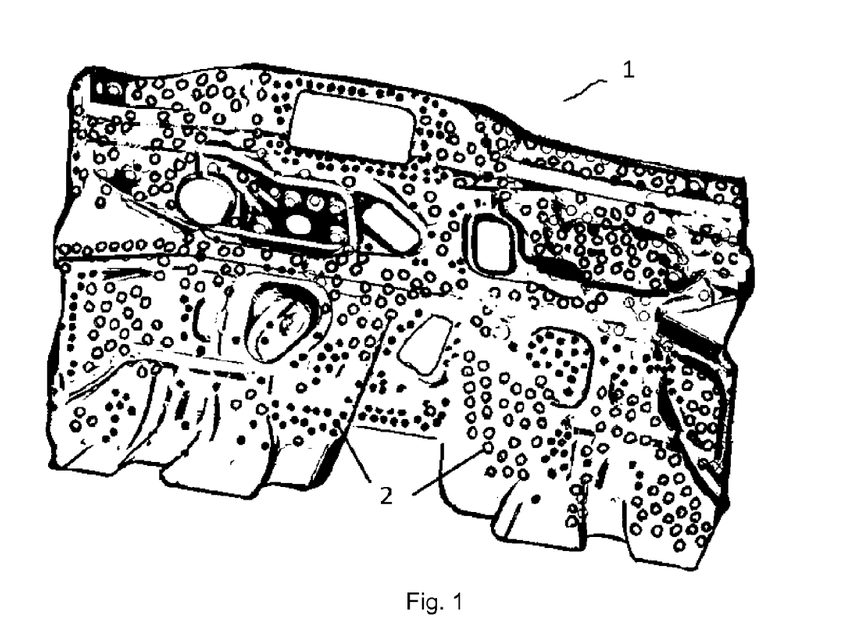
FIG. 1 shows a schematic example of indentation positions on a 3D trim part according to the invention.

FIG. 1 shows a schematic figure of an inner dash (1) with the position of indentations and the round base areas (2). The indentions and base areas have different sizes and are spread over the surface.

Figure 2:
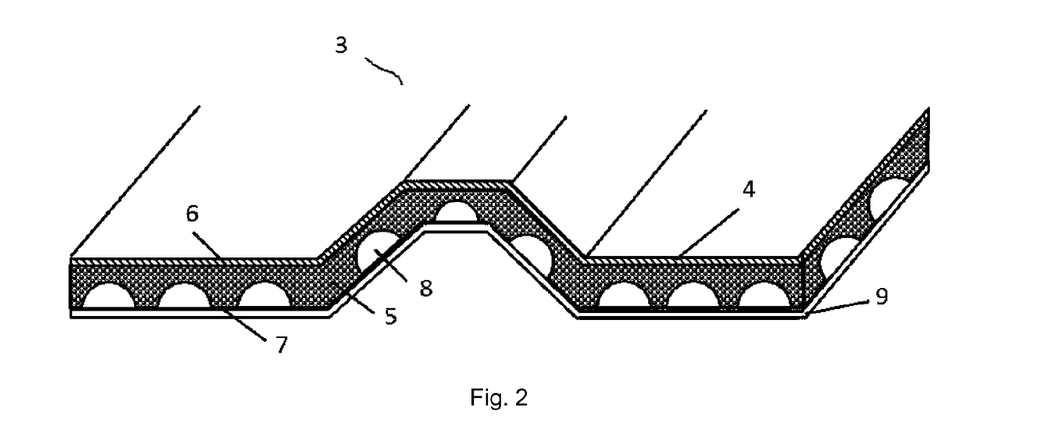
FIG. 2 shows a schematic cross section of a 3D part according to the invention.

FIG. 2 shows a schematic cross section of a 3D trim part (3) according to the invention. The indentations (8) with round base areas directed to the vehicle body (9) and with a decoupler foam layer (5) and a mass layer (4). The first surface (6) of the decoupling layer is directed to the mass layer and the second surface (7) is directed to the vehicle body.

Figure 3:
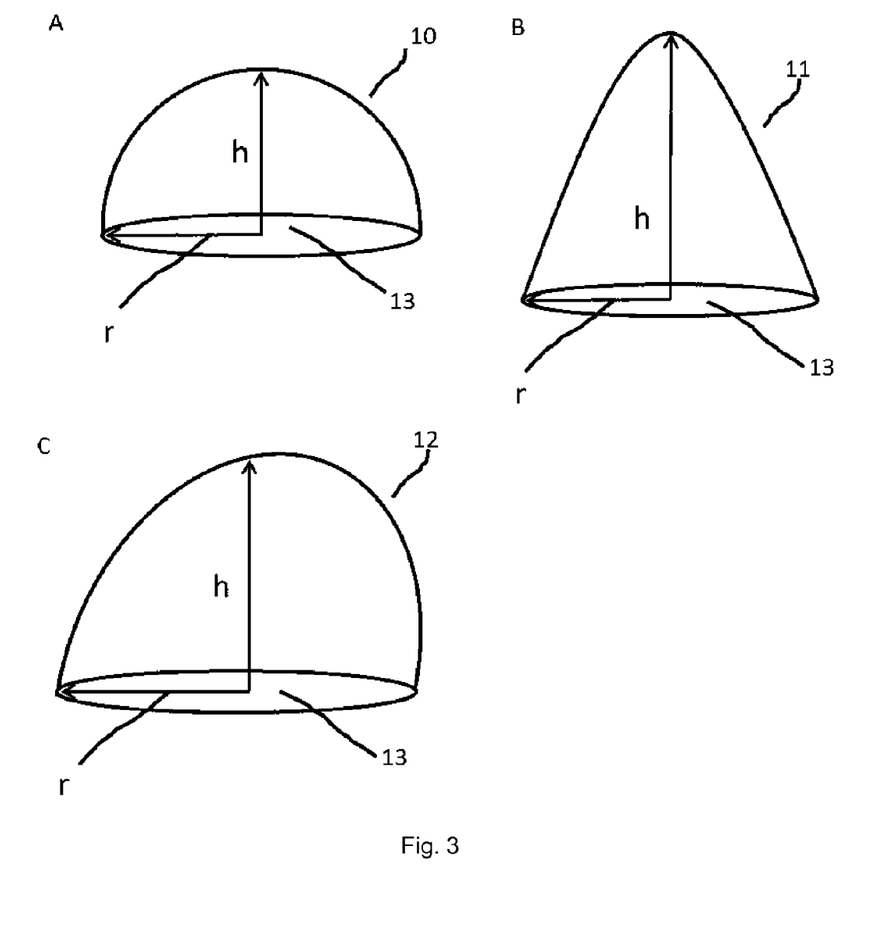
FIGS. 3A, 3B and 3C shows schematic examples of one hemispheroids (10, 11, 12) with a radius (r) and height (h) and round base area (13) according to the invention.

FIG. 3A shows a schematic example of a hemispherical shaped indentation (10) according to the invention with a radius (r) and a circular base area (13). Due to the hemispherical shape and circular base area the radius (r) and height (h) have the same length or at least approximately the same length. The hemispherical shaped indentation is creating a cavity with air and the circular base area located at the second surface of the decoupler is an area where the foam is not in contact with the metal layer, e.g. vehicle body. The circular base area may also have an oval shape or being approximately circular.

The total area of the circular base areas of the hemispherical shaped indentations is also referred to as the "area not in contact" with the vehicle body.

FIG. 3B shows a schematic example of a symmetrical hemispheroidal shaped indentation (11) according to the invention with a radius (r) and a circular base area (13). Due to the hemispheroidal shape and circular base area or round base area the radius (r) and height (h) does not have the same length.

FIG. 3C shows a schematic example of an unsymmetrical hemispheroidal shaped indentation (12) according to the invention with a radius (r) and a circular base area (13). Due to the hemispheroidal shape and circular base area or round base area the radius (r) and height (h) does not have the same length.

All the indentation shapes in FIGS. 3A, 3B and 3C have favourably shapes for demoulding properties and for improving the local stiffness of the decoupler layer compared to other cavities, for example square and or rectangular cavities.

FIGS. 4A, 4B and 4C shows examples of cross sections of noise attenuating trim parts for a vehicle (14) according to the invention with examples of hemispheroid e.g. hemispherical shaped indentations (10, 15, 16) in the decoupler layer (5) with a mass layer (4) and the vehicle body (9), e.g. a steel or aluminium layer. The thickness (T) is the total thickness of the decoupling layer being the thickness of the foam layer in areas without hemispheroidal shaped indentations and in areas with hemispheroidal shaped indentation T being the total height of the hemispheroidal shaped indentations and the foam layer thickness above the top (t) of the hemispheroidal shaped indentation. The round base area of the indentations is situated at the second surface (7) of the decoupling layer.

The indentations may be designed for better demoulding properties and or to improve the flow of the foam components during the foaming process. The hemispheroidal showed shown in FIGS. 4A, 4B and 4C have all both good demoulding properties and enhance the flow of the foam components during the foaming process. The indentations, also depending on the position, mostly do not have any walls parallel to the demoulding direction except just next to the second surface of the decoupling layer.

The shape of the hemispherical shaped indentation may vary depending on designed restrictions and space available.

FIG. 4A shows an example of a cross section of a trim part (14) according to the invention with an example of a non-symmetric hemispheroidal shaped indentation (15).

FIG. 4B shows an example of a cross section of a trim part (14) according to the invention with an example of a hemispheroidal shaped indentation with rounded edges (16).

FIG. 4C shows an example of a cross section of a trim part (14) according to the invention with an example of a substantially symmetric hemispherical shaped indentation (10). The distance (D) between two indentations should not be too small in order to simplify the demoulding of the trim part as well as ensure that local stiffness of the decoupling layer.

Figure 5:
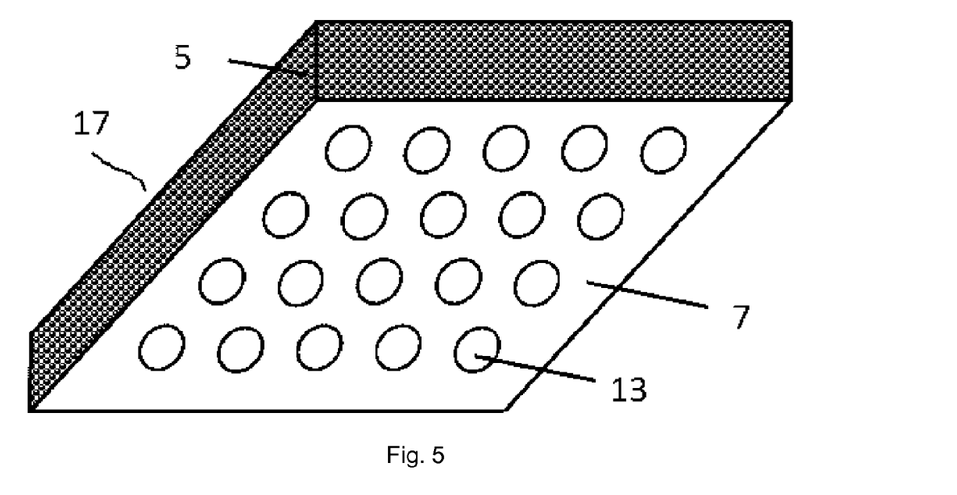
FIG. 5 shows a schematic example of a decoupling layer according to the invention with the second surface of the decoupling layer comprising indentations with round base areas.

FIG. 5 shows a schematic example of a decoupling layer (17) with the second surface (7) of the decoupling layer (5) with the round base areas (13) of the indentations.

Figure 6:
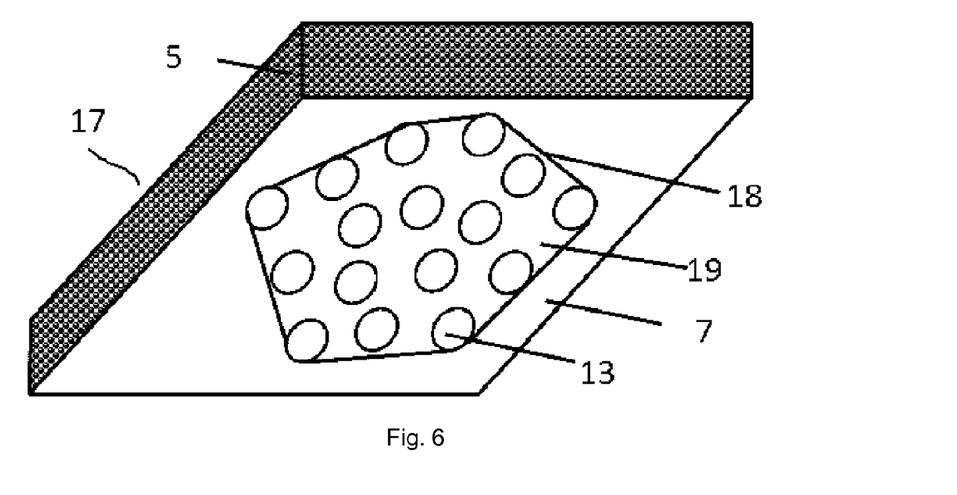
FIG. 6 shows a schematic example of a decoupling layer according to the invention with the second surface of the decoupling layer comprising a region with indentations wherein the region is the convex hull of the round base areas of the indentations.

FIG. 6 shows a schematic example of a decoupling layer (17) with the second surface (7) of the decoupling layer (5) with the round base areas (13) of the indentations arranged in a group, the group of indentations being in a region (19) defined by the convex hull (18) around the group of indentations and their round base areas.

Figure 7:
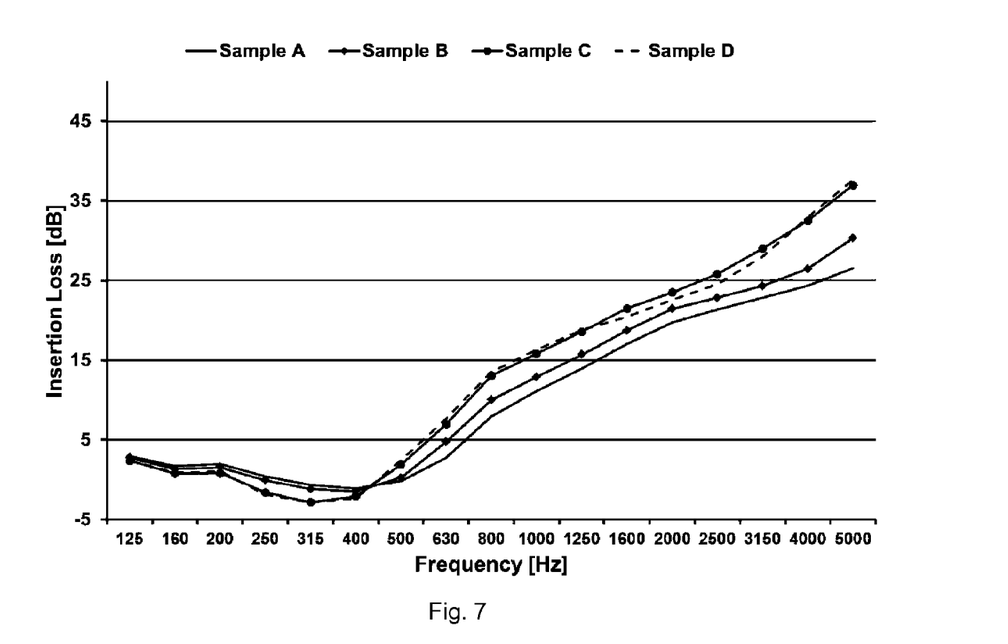
FIG. 7 shows measured insertion loss of flat samples according to the state of the art and according to the invention.

FIG. 7 shows measured insertion loss of four flat samples according to the state of the art and according to the invention. The insertion loss was measured with the, at Autoneum commercially available, device "Isokell".

The samples were measured on a steel panel representing the vehicle body.

All samples were made with decoupler layer made of the same type of polyurethane foam with density of about 50 kg/m$^3$ and a thickness of about 15 mm. The same type of mass layers, heavy layer with area weight 3 kg/m$^2$, is used for all samples.

Samples B, C and D where made with hemispherical shaped indentations with a circular base with 8 mm radius. Since the shape of the indentations was hemispherical the heights were also 8 mm.

Sample A is the reference sample according to the state of the art with a foam decoupler layer without any indentations.

Sample B has a total area of the circular base areas of the hemispherical shaped indentations that is approximately 6% of the total area of the second surface of the decoupling layer. As a result approximately 6% of the foam decoupler layer is not in contact with the steel panel.

Sample C has a total area of the circular base areas of the hemispherical shaped indentations that is approximately 40% of the total area of the second surface of the decoupling layer, according to the invention. As a result approximately 40% of the foam decoupler layer is not in contact with the steel panel.

Sample D has a total area of the circular base areas of the hemispherical shaped indentations that is approximately 60% of the total area of the second surface of the decoupling layer. As a result approximately 60% of the foam decoupler layer is not in contact with the steel panel.

As can be seen from FIG. 7 the resonance frequency for sample C and D is reduced from about 400 Hz to about 315 Hz indicating that the decoupler is overall softer than the reference sample and the sample B with only 6% of the second surface not in contact with the steel panel.

The sample C with 40% of the second surface not in contact with the steel panel is surprisingly performing the same or is even improving the IL in the important frequency range 1000 Hz to 4000 Hz, compared to the sample D that has a higher area not in contact with the steel panel.

Sample C has additionally better stiffness properties, such as tread strength, compared to sample D.

Sample C shows much better performance compared to sample B over most of the frequency range.

Figure 8:
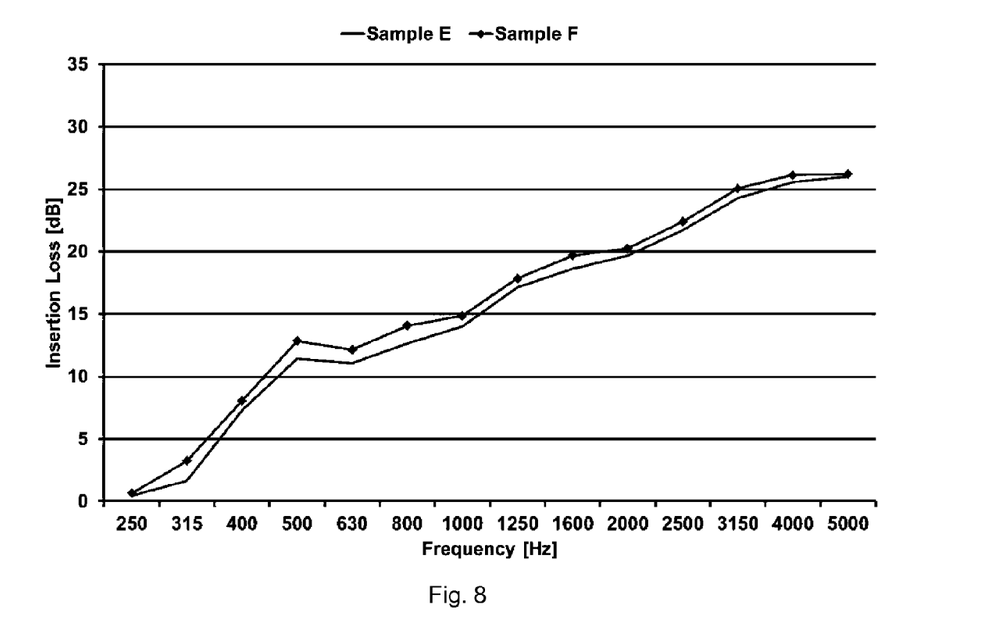
FIG. 8 shows measured insertion loss of an inner dash according to the state of the art and according to the invention.

FIG. 8 shows measured insertion loss of two 3D samples, inner dash insulators, according to the state of the art and according to the invention. The insertion loss was measured according to the current ISO 140-3.

The samples were measured on a steel dash, cut out from the vehicles body in white.

The two samples were made with decoupler layer made of the same type of polyurethane foam with density of about 50 kg/m$^3$ and a thickness of about 15 mm and the same type of mass layer of 2 kg/m$^2$ heavy layer.

Sample F is according to the invention comprising Indentations with two different dimensions in different areas of the decoupling layer depending on the thickness and space available in order to optimise the area not in contact. The indentations used for sample F are hemispheres with circular base areas with the radius and height of 8 mm and the second size with the radius and height of 12 mm.

Sample F has a total area of circular base areas of the hemispherical shaped indentations that is approximately 15% of the total area of the second surface of the decoupling layer, according to the invention. As a result approximately 15% of the foam decoupler layer is not in contact with the steel body. Indentation with two different dimensions has be used in different areas of the decoupling layer depending on the thickness and space available in order to optimise the area not in contact.

The indentations used for sample F are hemispheres with circular base areas with the radius and height of 8 mm and the second size with the radius and height of 12 mm.

The samples were measured on a steel dash, cut out from the vehicles body in white.

FIGS. 9A, 9B, 9C and 9D shows examples of cross sections of noise attenuating trim parts for a vehicle according to the invention with different mass layers, a decoupling layer (5) placed on a vehicle body (9), and the decoupler layer having hemispherical shaped indentations (10).

Figure 9:
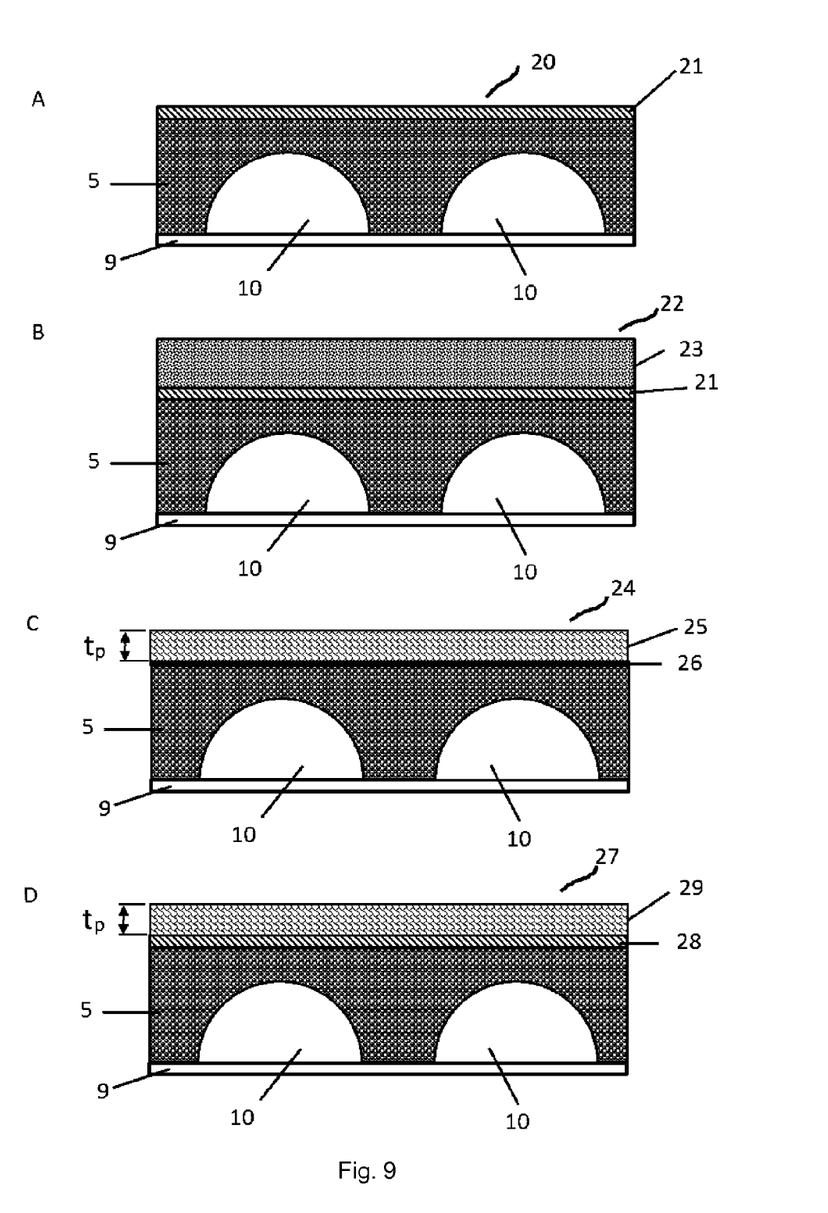
FIGS. 9A, 9B, 9C and 9D shows schematic examples of cross sections of a noise attenuating trim part according to the invention with different mass layers.

FIG. 9A shows a trim part (20) wherein the mass layer is a single impervious barrier layer e.g heavy layer (21) laminated to the decoupling layer (5). Preferably the area weight of the single mass layer is 800 to 6000 g/m$^2$, preferable 1500 to 4000 g/m$^2$.

FIG. 9B shows a trim part (22) wherein the mass layer is the same single impervious heavy layer (21) as shown in FIG. 9A, laminated to the decoupling layer (5) and wherein the trim part has an additional porous absorption layer (23) adjacent to the heavy layer. The additional porous absorption layer may be a lofty felt, 200-600 g/m$^2$, or soft open cell foam. Due to its loftiness and or low density this additional layer is not part of the mass layer since there is no, or very limited, weight contribution to the mass in the mass spring system and it does not participate actively to the insulating function of the trim part.

FIG. 9C shows a trim part (24) with a decoupling layer according to the invention and with a mass layer consisting of a thin impervious barrier layer in the form of a thin film or foil (26) and a porous fibrous layer (25) with a dynamic compression Young's modulus $E > 96 * AW * t_p$ in Pascal (Pa). AW is the area weight in g/m$^2$ of the porous fibrous layer and is between 400 to 2500 g/m$^2$, preferably 700 to 1500 g/m$^2$, and the thickness ($t_p$) of the fibrous layer is between 2 and 15 mm, preferably between 3 and 10 mm. The thin film or foil and has an area weight of less than 200 g/m$^2$ and a thickness of at least 40 micrometers (μm), preferably 60 to 100 (μm), preferably 60 to 80 (μm).

FIG. 9D shows a trim part (27) with a decoupling layer according to the invention and with a mass layer consisting of a impervious barrier layer in the form of a heavy layer (28) and a porous fibrous layer (29) with a dynamic compression Young's modulus $$E > 118 * t_p * (AW_b * AW_p + (AW_p * AW_p/4))/(AW_b + AW_p)$$
in Pascal(Pa)

$AW_b$ is the area weight in g/m$^2$ of the impervious barrier layer and is between 500 to 4000 g/m$^2$, preferably 1500 to 3000 g/m$^2$.

The impervious barrier layer has an area weight of at least 500 g/m$^2$, preferably between 500 to 4000 g/m$^2$, preferably 1500 to 3000 g/m$^2$.

$AW_p$ is the area weight in g/m$^2$ of the porous fibrous layer and is between 400 to 2500 g/m$^2$, preferably 800 to 1600 g/m$^2$, and the thickness ($t_p$) of the fibrous layer is between 2 and 15 mm, preferably between 3 and 10 mm.

The invention claimed is:

1. A noise attenuating trim part for a vehicle, with acoustic mass-spring characteristics, comprising:
   a mass layer having an impervious barrier layer;
   a decoupling layer comprising open cell foam, the decoupling layer having a first surface laminated to the mass layer and a second surface facing away from the mass layer and adapted for interconnection to a vehicle body, wherein the second surface includes
   at least one region with a plurality of indentations, and
   wherein each indentation is defined by a geometric shape bounded by a generally round base area that corresponds with the second surface, such that the entirety of the round base areas are configured to contact the vehicle body and the geometric shapes define cavities between the decoupling layer and the vehicle body;
   wherein the total surface area of the generally round base areas is between 10 and 40% of the total surface area of the second surface of the decoupling layer; and
   wherein a shortest distance (D) between two indentations is more than 4 mm.

2. The noise attenuating trim part according to claim 1, wherein the radius (r) of the generally round base areas is between 4 to 20 mm.

3. The noise attenuating trim part according to claim 1, wherein the total surface area of the base areas is between 15 and 35% of the total surface area of the second surface of the decoupling layer.

4. The noise attenuating trim part according to claim 1, wherein the height (h) of the indentations is between 40 and 74% of the total thickness (T) of the decoupling layer being the shortest distance from the base area of the indentation to the first surface of the decoupling layer.

5. The noise attenuating trim part according to claim 1, wherein the height (h) of the indentations is between 4 to 20 mm.

6. The noise attenuating trim part according to claim 1, wherein the decoupling layer includes a convex portion that defines the at least one region with a plurality of indentations, and wherein the region has at least 15 indentations and wherein the total surface area of the generally round base areas within the at least one region is between 25 and 50% of the surface area of the at least one region.

7. The noise attenuating trim part according to claim 1, wherein the decoupling layer is made of polyurethane foam.

8. The noise attenuating trim part according to claim 1, wherein at least one of the generally round base areas has an elliptic shape.

9. The noise attenuating trim part according to claim 1, wherein at least one of the indentations has the geometrical shape of a hemi spheroid.

10. The noise attenuating trim part according to claim 9, wherein the hemispheroid shape with a profile adjacent to the second surface is cylindrical, perpendicular to the second surface, and bounded by the round base areas.

11. The noise attenuating trim part according to claim 1, wherein the foam has a density between 25 to 100 kg/m$^3$.

12. The noise attenuating trim part according to claim 1, wherein the impervious barrier layer is made of a thermoset plastic material selected from the group consisting of ethylene vinyl acetate (EVA) copolymer, polyester, polyethylene terephthalate, high density polyethylene, low density polyethylene, linear low density polyethylene, polypropylene, thermoplastic elastomer, thermoplastic rubber and polyvinyl chloride (PVC), or any combination thereof.

13. The noise attenuating trim part according to claim 1, wherein the mass layer has an area weight between 500 to 6500 g/m$^2$.

14. The noise attenuating trim part according to claim 13, wherein the mass layer consists of the impervious barrier layer with an area weight between 800 to 6000 g/m$^2$.

15. The noise attenuating trim part according to claim 14, further comprising an additional layer adjacent to the mass layer, wherein the additional layer is made of porous felt with an area weight of 200 to 600 g/m$^2$ or open cell foam.

16. The noise attenuating trim part according to claim 13, wherein the mass layer consists of the impervious barrier layer and a porous fibrous layer;
wherein the porous fibrous layer has a dynamic compression Young's modulus E of at least $96*AW* t_p$ (Pa), with AW area weight (g/m$^2$) and $t_p$ thickness (mm) of the porous fibrous layer;
wherein the impervious barrier layer has an area weight of less than 200 g/m$^2$; and
wherein the impervious barrier layer is situated between the fibrous layer and the decoupling layer and all layers are laminated together.

17. The noise attenuating trim part according to claim 16, wherein the mass layer has an area weight between 500 to 2600 g/m$^2$.

18. The noise attenuating trim part according to claim 13, wherein the mass layer consists of the impervious barrier layer and a porous fibrous layer, with the impervious barrier layer being situated between the porous fibrous layer and the decoupling layer and all layers are laminated together, and
wherein the porous fibrous layer has a dynamic compression Young's modulus (Pa) of at least $118* t_p* (AW_b*AW_p+(AW_p*AW_p/4))/(AW_b+AW_p)$;
wherein $AW_b$ being area weight (g/m$^2$) of the barrier layer, $AW_p$ being area weight (g/m$^2$) of the porous fibrous layer, $t_p$ being thickness (mm) of the porous fibrous layer; and
wherein the impervious barrier layer has an area weight of at least 500 g/m$^2$.

19. The noise attenuating trim part according to claim 18, wherein the impervious barrier layer has an area weight between 500 to 4000 g/m$^2$; and
wherein the porous fibrous layer has an area weight between 400 to 2500 g/m$^2$.

20. The noise attenuating trim part according to claim 16, wherein the thickness $t_p$ of the porous fibrous layer is between 2 and 15 mm.

21. The noise attenuating trim part according to claim 1, further comprising at least one of a decorative layer or a carpet layer, and wherein the mass layer is situated in between the decoupling layer and the decorative layer or carpet layer.

22. The noise attenuating trim part according to claim 1, wherein the plurality of indentations comprise at least one of indentations of a first size and indentations of a second size, and indentations of a first shape and indentations of a second shape.

23. The noise attenuating trim part according to claim 1, wherein the plurality of indentations are not equally spaced from each other.

24. The noise attenuating trim part according to claim 1, wherein the plurality of indentations are randomly spaced.

25. The noise attenuating trim part according to claim 1, wherein the compression stiffness of the foam is comprised between 4 kPa and 20 kPa, being the compression stiffness corresponding to the CLD40 value measured according to ISO 3386-1.

26. The noise attenuating trim part according to claim 1, wherein the second surface is selectively deformable and adapted to engage a vehicle body having an irregular surface.

27. A method of using the noise attenuating trim part according to claim 1, as a floor covering or inner dash, wherein the second surface of the decoupling layer with a plurality of indentations is facing the vehicle floor and or firewall.

\* \* \* \* \*